(12) United States Patent
Shin

(10) Patent No.: US 7,624,905 B2
(45) Date of Patent: Dec. 1, 2009

(54) APPARATUS FOR MANUFACTURING SEALED FLUX LAMINATED ALLOY FILLER METAL

(76) Inventor: Young Sik Shin, 1612-901 Seongyeong Apartment, Sarangmaeul 415, Sang-dong Wonmi-gu, Bucheon-si Gyeonggi-do (KR) 420-709

( * ) Notice: Subject to any disclaimer, the term of this patent is extended or adjusted under 35 U.S.C. 154(b) by 0 days.

(21) Appl. No.: 12/162,927

(22) PCT Filed: Apr. 13, 2007

(86) PCT No.: PCT/KR2007/001814

§ 371 (c)(1),
(2), (4) Date: Jul. 31, 2008

(87) PCT Pub. No.: WO2007/119983

PCT Pub. Date: Oct. 25, 2007

(65) Prior Publication Data

US 2009/0173768 A1     Jul. 9, 2009

(51) Int. Cl.
*B23K 37/00* (2006.01)
(52) U.S. Cl. .................. 228/17; 228/17.5; 219/145.22
(58) Field of Classification Search ........................ None
See application file for complete search history.

(56) References Cited

U.S. PATENT DOCUMENTS

| | | | | |
|---|---|---|---|---|
| 1,525,840 A | * | 2/1925 | Weed | ............. 219/145.23 |
| 3,127,674 A | * | 4/1964 | Kohler | ............. 228/147 |
| 6,629,632 B1 | * | 10/2003 | Jack et al. | ............. 228/147 |
| 6,828,523 B1 | * | 12/2004 | Gysi | ............. 219/121.13 |
| 2005/0044687 A1 | * | 3/2005 | Matsuguchi et al. | ........ 29/455.1 |
| 2006/0261054 A1 | * | 11/2006 | Katiyar | ............. 219/145.22 |
| 2007/0193228 A1 | * | 8/2007 | Astier | ............. 53/452 |

FOREIGN PATENT DOCUMENTS

| JP | 60124496 A | * | 7/1985 |
|---|---|---|---|
| JP | 02011297 A | * | 1/1990 |
| JP | 06-106385 | | 4/1994 |
| JP | 06106385 A | * | 4/1994 |
| JP | 10-128579 | | 5/1998 |
| JP | 11285892 A | * | 10/1999 |
| JP | 2001-179326 | | 7/2001 |
| JP | 2001179326 A | * | 7/2001 |

* cited by examiner

*Primary Examiner*—Kiley Stoner
(74) *Attorney, Agent, or Firm*—Saliwanchik, Lloyd & Saliwanchik

(57) ABSTRACT

Disclosed therein is a filler metal (90) used as a bonding material in bonding technology by brazing and soldering and an apparatus for manufacturing the same. A flux cored alloy filler metal 200 according to a prior art has a problem in that a flux is leaked through a joint 93 during the brazing work or carriage of the filler metal. However, a sealed flux laminated alloy filler metal (100) according to the present invention is a laminated W-shaped filler metal (92) bent several times and having a compact W-shaped section and a flux (51) is filled between overlapped surfaces of the W-shaped filler metal (92), so that the powdered flux (51) is not leaked during the brazing work or carriage of the filler metal. Moreover, an apparatus for manufacturing the filler metal is automated to improve productivity.

2 Claims, 5 Drawing Sheets

[Fig. 1]
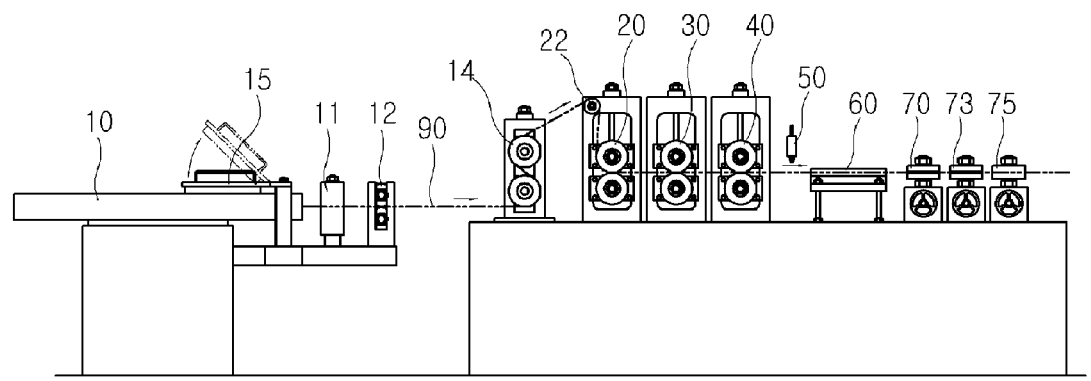
[Fig. 2]
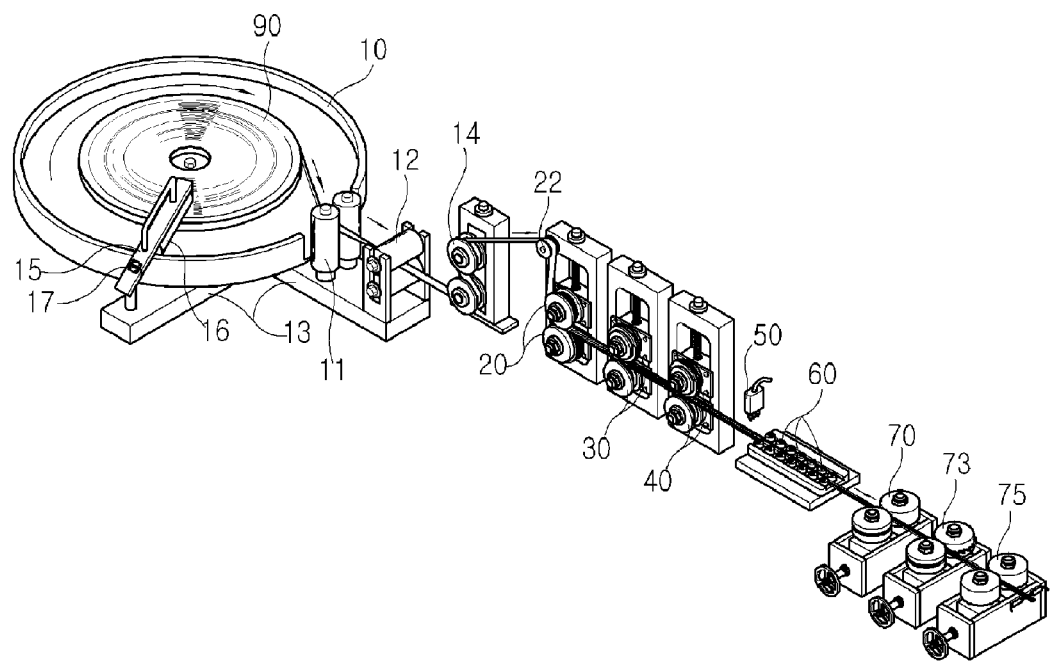

[Fig. 3]
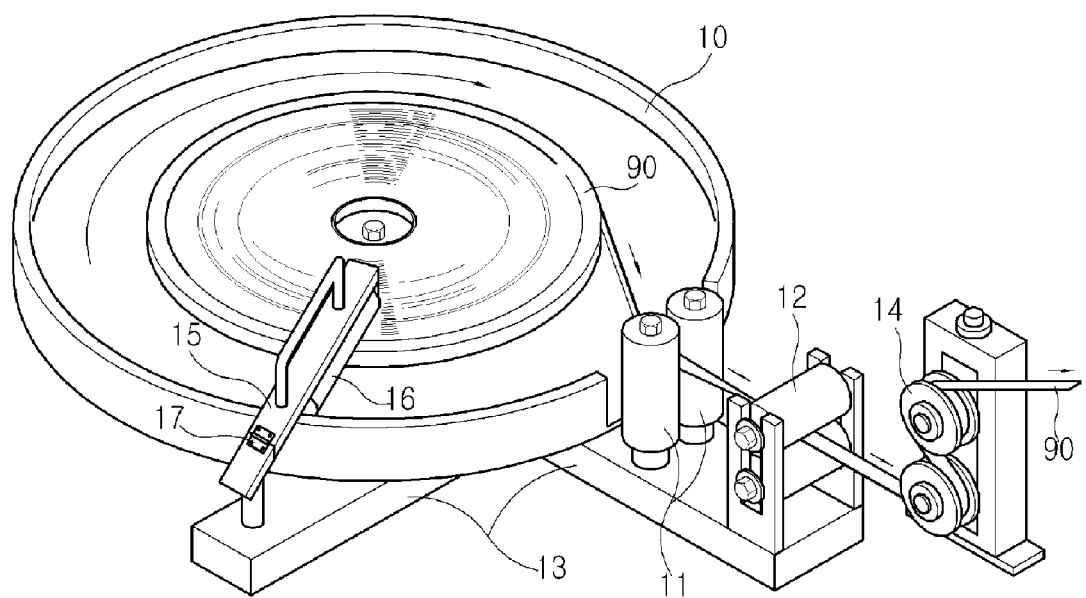

[Fig. 4]
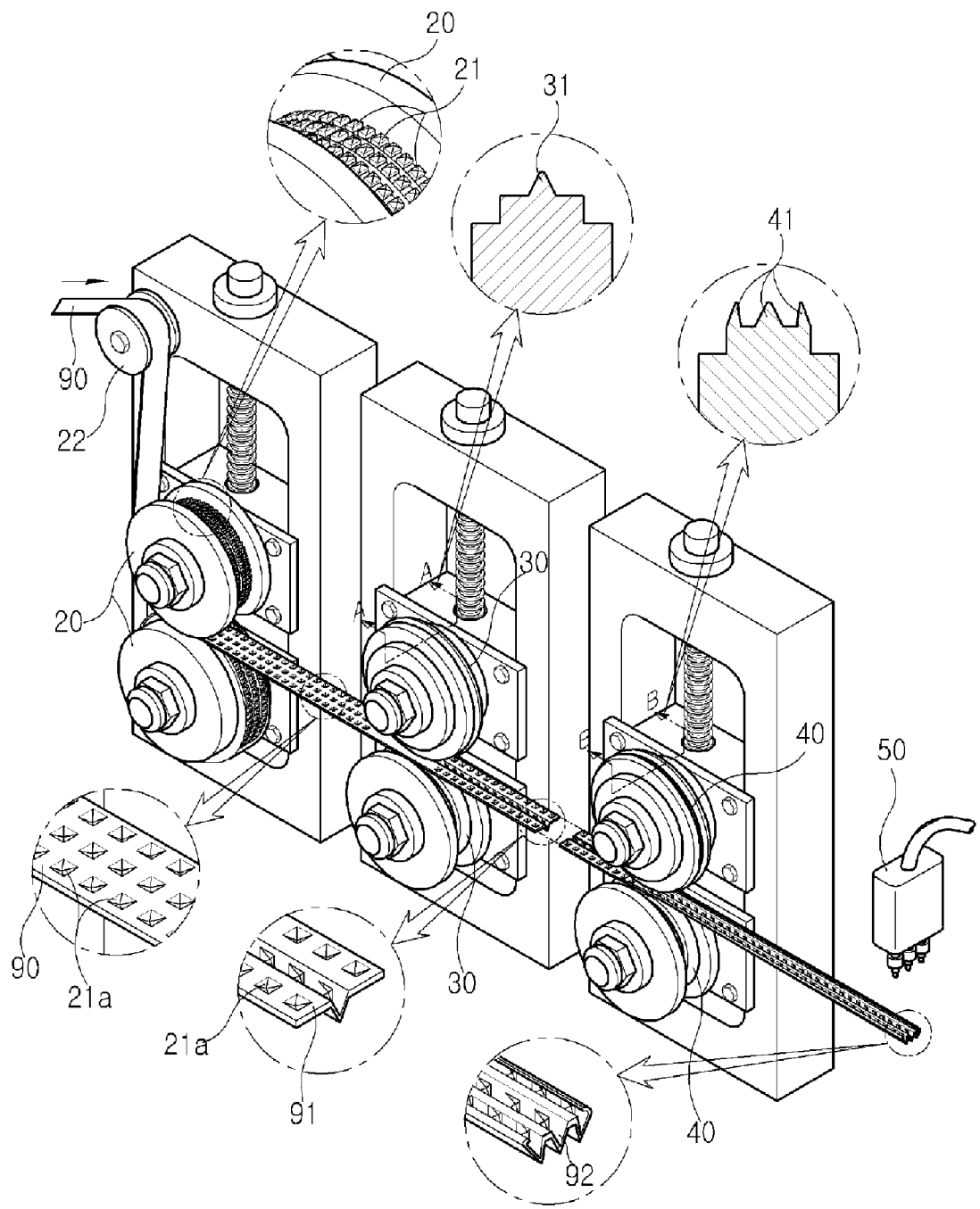

[Fig. 5]
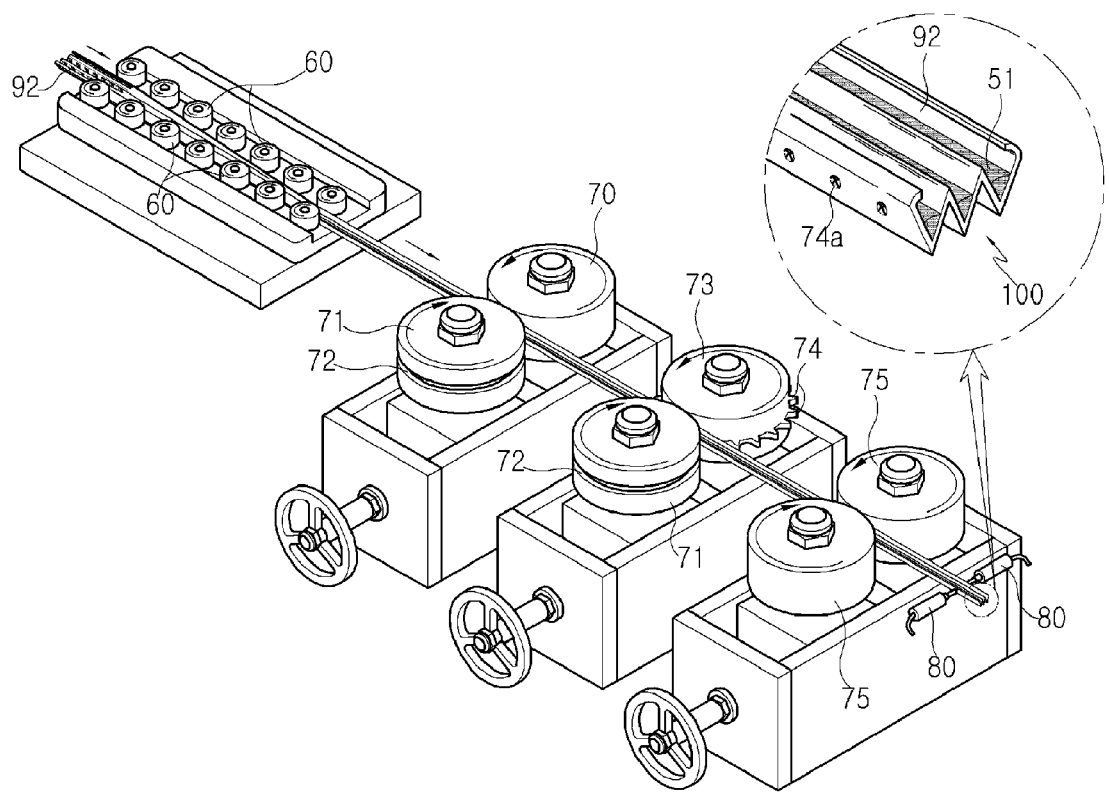

[Fig. 6]
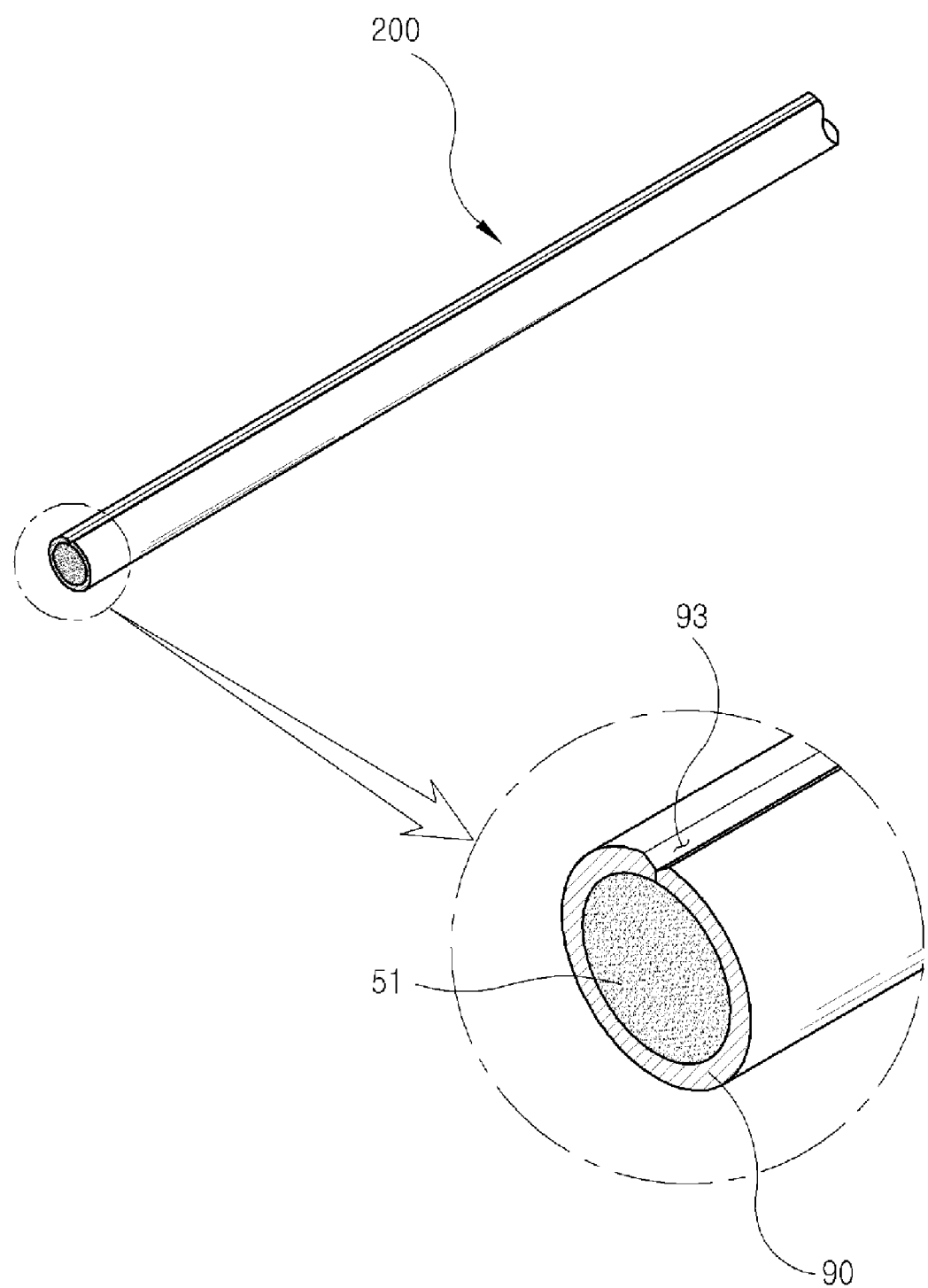

APPARATUS FOR MANUFACTURING SEALED FLUX LAMINATED ALLOY FILLER METAL

CROSS-REFERENCE TO RELATED APPLICATION

This application is the U.S. national stage application of International Patent Application No. PCT/KR2007/001814, filed Apr. 13, 2007, the disclosure of which is hereby incorporated by reference in its entirety, including all figures, tables and amino acid or nucleic acid sequences.

TECHNICAL FIELD

The present invention relates to a filler metal used as a bonding material in bonding technology by brazing and soldering and an apparatus for manufacturing the same.

More particularly, the present invention relates to a sealed flux laminated alloy filler metal for preventing a leakage of a powdered flux during the brazing work or carriage of the filler metal by filling the flux, which is used to improve a bonding force of two base metals at the time of the brazing work, between overlapped surfaces of the filler metal bent several times in a laminated state, and an apparatus for manufacturing the sealed flux laminated alloy filler metal.

BACKGROUND ART

Brazing-bonding technology will be described hereinafter in brief. Brazing is performed in a temperature range below the melting point of base metals, to be bonded with each other, at a working temperature of 450° C. or more. The brazing features that a filler metal melted by means of brazing permeates between the two base metals, which face each other, to bond the base metals with each other, and in this instance, the base metals are not transformed.

In the brazing-bonding technology, a property indicating a degree of bonding affinity between two base metals and the filler metal is called wetting, and a phenomenon that the filler metal flows between the base metals to be bonded with each other is called capillary.

To improve the bonding affinity to the base metals, for the filler metal, alloy including silver, copper, zinc, cadmium, phosphorus, nickel, manganese, tin, aluminum, silicon, lead and the like is selected in consideration of kinds and the melting point of the base metals.

The selected filler metal is used as a bonding material for bonding the two base metals with each other during the brazing work. The filler metal generates an oxide while being melted, and flux such as borate, alkaline, chloride, borax and boron is used to prevent the oxide, directly dissolve unnecessary materials, promote removal of the unnecessary materials, or prevent generation itself of the unnecessary materials.

The flux has the following functions. First, the flux dissolves or absorbs the oxide, which remains on the surface of a brazing product or is generated during heating. Second, the flux restrains oxidation of the surface of the base metal during heating. Third, the flux keeps a clean state of the surface of the base metal during the brazing work to increase a fluidity of the filler metal. Moreover, the flux indicates temperature for brazing or increases wetting of the filler metal.

The flux is manufactured in various states of liquid, powder and paste, and may be used separately from the filler metal during the brazing work or used as a compound in which the flux is compounded with the filler metal.

As kinds of the compound, there are a flux coated alloy in which the flux is coated on the outer surface of the alloy selected as the filler metal, a flux cored alloy in which the powdered fluxis injected into the alloy selected as the filler metal, and a flux mixed alloy in which the filler metal and the flux are mixed with each other.

Particularly, as shown in FIG. 6, a flux cored alloy filler metal 200 according to a prior art is manufactured by the steps of injecting a powdered flux 51 into a wire type filler metal 90 and rolling the filler metal 90. So, the flux cored alloy filler metal according to the prior art entails a problem in that a joint 93 is inevitably formed and so the powdered flux 51 may be continuously leaked from the joint 93.

DISCLOSURE OF INVENTION

Technical Problem

Accordingly, the present invention has been made to solve the above-mentioned problems of the flux cored alloy filler metal of the prior art that the flux is leaked from the joint during the working or carrying, and it is an object of the present invention to provide a sealed flux laminated alloy filler metal having a compact W-shaped section with overlapped surfaces to thereby provide a wider heating cross section area per the unit area than the conventional flux cored alloy filler metal having a circular section, so that the filler metal is rapidly melted during the bonding so as to rapidly bond two base metals.

Another object of the present invention is to provide an automated mechanical apparatus for manufacturing the sealed flux laminated alloy filler metal.

Technical Solution

To achieve the above objects, the present invention provides an apparatus for manufacturing a sealed flux laminated alloy filler metal comprising: a disc-type supply stand for winding a scroll type filler metal thereon; a mounting stand mounted below the supply stand; an aligning guide hingedly mounted on the mounting stand via a hinge and having an aligning roller for pressurizing the upper end of the scroll type filler metal; a pair of vertical guide rollers and a pair of horizontal guide rollers for supplying a strip of the filler metal released from the scroll type filler metal to a pair of tension rollers; a pair of embossing rollers mounted vertically for forming embossed marks on the surface of the filler metal passing through the tension rollers while the filler metal passes therethrough; a pair of V-shaped forming rollers mounted vertically for transforming the filler metal formed with the embossed marks into a V-shaped filler metal while the filler metal passes therethrough; a pair of W-shaped forming rollers mounted vertically for transforming the V-shaped filler metal into a W-shaped filler metal while the V-shaped filler metal passes therethrough; a flux injector for filling a flux between overlapped surfaces of the W-shaped filler metal; reducing rollers for reducing a horizontal width of the W-shaped filler metal filled with the flux, the reducing rollers being arranged by pairs, wherein an interval between each pair of the reducing rollers, which are arranged correspondingly to each other, is gradually reduced in a conveyance direction of the W-shaped filler metal; a compression roller and a first stereotype roller for compressing and stereotyping either side of the W-shaped filler metal having the reduced horizontal width, the stereotype roller having a groove formed on the outer peripheral surface thereof; a saw-tooth roller and a second stereotype roller for forming saw-tooth marks on a side surface of the W-shaped filler metal to prevent a leakage of the flux; and a winder for winding the W-shaped filler metal thereon.

Advantageous Effects

The apparatus according to the present invention manufactures the sealed flux laminated alloy filler metal, in which the flux is filled between overlapped surfaces of the laminated filler metal bent several times. So, the present invention can prevent a leakage of the powdered flux during the brazing work or carriage of the filler metal, and improve productivity through an automated production of the sealed flux laminated alloy filler metal.

BRIEF DESCRIPTION OF THE DRAWINGS

FIG. 1 is a front view of an apparatus for manufacturing a sealed flux laminated alloy filler metal according to the present invention.

FIG. 2 is a perspective view of the apparatus for manufacturing the sealed flux laminated alloy filler metal.

FIG. 3 is a perspective view for explaining a supply of the filler metal.

FIG. 4 is a perspective view for explaining filler metal embossing work and bending work.

FIG. 5 is a perspective view for explaining filler metal reducing work and compressing work.

FIG. 6 is a perspective view of a flux cored alloy filler metal according to a prior art.

MODE FOR THE INVENTION

Reference will be now made in detail to the preferred embodiment of the present invention with reference to the attached drawings.

FIGS. 1 and 2 are a front view and a perspective view of an apparatus for manufacturing a sealed flux laminated alloy filler metal according to the present invention, and FIG. 3 is a perspective view for explaining a supply of the filler metal.

As shown in FIGS. 1 and 2, a filler metal 90 selected in consideration of a kind and a melting point of both base metals for brazing work is wound on a supply stand 10. The filler metal 90 is a plate-type filler metal of a band shape, and wound on the supply stand 10 in a scroll type.

As shown in FIG. 3, the supply stand 10 is in a disc shape, and an aligning guide 15 is hingedly mounted on a mounting stand 13 via a hinge 17. In this instance, the mounting stand 13 is mounted below the supply stand 10.

The aligning guide 15 is to prevent that the scroll type filler metal 90 gets loose and tangled while a strip of the filler metal 90 is loosened and supplied to vertical guide rollers 11 and horizontal guide rollers 12 after the scroll type filler metal 90 is wound on the supply stand 10.

The aligning guide 15 has an aligning roller 16 for pressurizing the upper surface of the filler metal 90 with a weak power, so that the filler metal 90 can keep the scroll form without interruption of the supply of the filler metal 90 during the supply of the filler metal 90.

Meanwhile, as shown in FIG. 3, a strip of the filler metal 90 loosened from the scroll type filler metal 90 passes the vertical guide rollers 11 standing on the mounting stand 13 of the supply stand 10, gets twisted horizontally by the horizontal guide rollers 12, and then, is wound on a pair of tension rollers 14, which are vertically mounted, in the Alphabet of "S", whereby the filler metal 90 can be supplied in a tensioned state.

FIG. 4 is a perspective view for explaining filler metal embossing work and bending work. The filler metal 90 passing through the tension rollers 14 passes an auxiliary roller 22. After that the filler metal 90 becomes a V-shaped filler metal 91 and a W-shape filler metal 92 having embossed marks 21a while passing through a pair of embossing rollers 20, a pair of V-shaped forming rollers 30 and a pair of W-shaped forming rollers 40.

The filler metal 90 passing through the embossing rollers 20 has clear embossed marks 21a by an embossed form 21 formed on the outer peripheral surface of the embossing rollers 20 as shown in the first circled enlarged view of the lower part of FIG. 4.

The filler metal 90 having the embossed marks 21a becomes the V-shaped filler metal 91 having a V-shaped groove formed at the center thereof as shown in the second circled enlarged view of the lower part of FIG. 4 while passing through the V-shaped forming rollers 30.

The upper V-shaped forming roller 30 of the V-shaped forming rollers 30 has a V-shaped protrusion 31 formed on the outer peripheral surface thereof as shown in the second circled enlarged view of the upper part of FIG. 4 showing a section taken along the line of A-A of FIG. 4, and the lower V-shaped forming roller 30 corresponding to the upper V-shaped forming roller 30 has a bent groove, so that the filler metal 90 passing through the V-shaped forming rollers 30 can become the V-shaped filler metal 91 having the V-shaped groove.

After that, the V-shaped filler metal 91 becomes the W-shaped filler metal 92 having a W-shaped groove as shown in the third circled enlarged view of the lower part of FIG. 4 while passing through the W-shaped forming rollers 40.

In the same way as the V-shaped forming rollers 30, the upper W-shaped forming roller 40 of the W-shaped forming rollers 40 has protrusions 41 formed on the outer peripheral surface thereof in the Alphabet of "W" as shown in the third circled enlarged view of the upper part of FIG. 4 showing a section taken along the line of B-B of FIG. 4, and the lower W-shaped forming roller 40 corresponding to the upper W-shaped forming roller 40 has bent grooves, whereby the V-shaped filler metal 90 passing through the W-shaped forming rollers 40 can become the W-shaped filler metal 92 having the grooves formed in the Alphabet of "W".

In addition, a powdered flux 51 is continuously injected between the grooves of the W-shaped filler metal 92 by a flux injector 50.

FIG. 5 is a perspective view for explaining reducing work and compressing work for forming a compact type W-shaped filler metal 92 by reducing a horizontal width of the W-shaped filler metal 92.

As shown in FIG. 5, a plurality of reducing rollers 60 arranged by a pair are mounted in series, and in this instance, an interval between each pair of the reducing rollers 60, which are arranged correspondingly to each other, is gradually reduced in a conveyance direction of the W-shaped filler metal 92 in such a way that the horizontal width of the W-shaped filler metal 92 can be reduced while the W-shaped filler metal 92 passes through the reducing rollers 60.

The W-shaped filler metal 92 passing through the reducing rollers 60 passes between a compression roller 70 and a stereotype roller 71. The stereotype roller 71 has a groove 72 formed on the outer peripheral surface thereof to which the W-shaped filler metal 92 is inserted, so that the W-shaped filler metal 92 can be stereotyped in a fixed size while being compressed and pushed into the groove 72 of the stereotype roller 71 by a compression force of the compression roller 70.

The stereotyped W-shaped filler metal 92 gets saw-tooth marks 74a formed on a side surface thereof at predetermined intervals as shown in a circled enlarged view of FIG. 5 while passing between a saw-toothed roller 73 having the teeth of a saw formed on the outer peripheral surface thereof and another stereotype roller 71, whereby the injected powdered flux 51 is not leaked.

The W-shaped filler metal 92 having the saw-tooth marks 74a by the saw-toothed roller 73 is finally compressed and discharged through discharge rollers 75. Next, as shown in FIG. 5, overlapped surfaces of the W-shaped filler metal 92 are sealed with each other by means of welding using welding bars 80.

The welding bars 80 shown in FIG. 5 are ultrasonic guns. When the ultrasonic guns apply ultrasonic waves to either side of the W-shaped filler metal 92, the overlapped surfaces of the laminated W-shaped filler metal 92 are sealed with each other. For the welding work, one of all welding methods including the ultrasonic welding can be used.

A circled enlarged view of FIG. 5 illustrates an excessive enlargement of a real product to explain the present invention. In case of the real product, its section is seen in a rectangular form with naked eyes since the bent surfaces are formed very densely.

Since the sealed flux laminated alloy filler metal 100 according to the present invention is manufactured by filling the powdered flux 51 between the overlapped surfaces of the laminated band-shaped filler metal, the flux 51 is rarely leaked while being carried or used, and even though the flux 51 is leaked, the flux 51 is limitedly leaked only at a bent portion.

Furthermore, since the sealed flux laminated alloy filler metal 100 is bent and overlapped in the laminated state, it has a wider heating cross section area per the unit area than the flux cored alloy filler metal 200 according to the prior art shown in FIG. 6, and so, a heating time becomes faster.

Meanwhile, since the flux 51 filling the sealed flux laminated alloy filler metal 100 is also overlapped in the laminated state, the flux 51 which is close to the filler metal 90 is rapidly mixed with the filler metal 90 during melting, and so, a fluidity of the filler metal is increased.

Finally, the apparatus for manufacturing the sealed flux laminated alloy filler metal 100 includes: the disc-type supply stand 10 for winding the scroll type filler metal 90 thereon; the mounting stand 13 mounted below the supply stand 10; the aligning guide 15 hingedly mounted on the mounting stand 13 via the hinge 17 and having the aligning roller 16 for pressurizing the upper end of the scroll type filler metal 90; the vertical guide rollers 11 and the horizontal guide rollers 12 for supplying a strip of the filler metal released from the scroll type filler metal 90 to a pair of the tension rollers 14; a pair of the embossing rollers 20 mounted vertically for forming the embossed marks 21a on the surface of the filler metal 90 passing through the tension rollers 14; a pair of the V-shaped forming rollers 30 mounted vertically for transforming the filler metal 90 having the embossed marks 21a into the V-shaped filler metal 91; a pair of the W-shaped forming rollers 40 mounted vertically for transforming the V-shaped filler metal 91 into the W-shaped filler metal 92; the flux injector 50 for filling the flux 51 between overlapped surfaces of the W-shaped filler metal 92; the reducing rollers 60 for reducing the horizontal width of the W-shaped filler metal 92 filled with the flux 51, the reducing rollers 60 being arranged by pairs, the interval between each pair of the reducing rollers 60, which are arranged correspondingly to each other, is gradually reduced in the conveyance direction of the W-shaped filler metal 92; the compression roller 70 and the stereotype roller 71 for compressing and stereotyping either side of the W-shaped filler metal 92 having the reduced horizontal width, the stereotype roller 71 having the groove 72 formed on the outer peripheral surface thereof; the saw-tooth roller 73 and the other stereotype roller 71 for forming the saw-tooth marks 74a on a side surface of the W-shaped filler metal 92 to prevent a leakage of the flux 51; and a winder for winding the W-shaped filler metal 92 thereon after the overlapped surfaces of the W-shaped filler metal 92 having the saw-tooth marks 74a are sealed by means of welding using the welding bars 80.

INDUSTRIAL APPLICABILITY

As described above, the present invention provides the sealed flux laminated alloy filler metal, in which the flux is filled between overlapped surfaces of the laminated filler metal bent several times, and the apparatus for manufacturing the sealed flux laminated alloy filler metal.

So, the present invention can solve the problem of the flux cored alloy filler metal according to the prior art that the flux is leaked through the joint, and improve productivity through an automated production of the sealed flux laminated alloy filler metal.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. An apparatus for manufacturing a sealed flux laminated alloy filler metal, the apparatus comprising:
    a disc-type supply stand for winding a scroll type filler metal thereon;
    a mounting stand mounted below the supply stand;
    an aligning guide hingedly mounted on the mounting stand via a hinge and having an aligning roller for pressurizing the upper end of the scroll type filler metal;
    a pair of vertical guide rollers and a pair of horizontal guide rollers for supplying a strip of the filler metal loosened from the scroll type filler metal to a pair of tension rollers;
    a pair of embossing rollers mounted vertically for forming embossed marks on the surface of the filler metal passing through the tension rollers while the filler metal passes therethrough;
    a pair of V-shaped forming rollers mounted vertically for transforming the filler metal formed with the embossed marks into a V-shaped filler metal while the filler metal passes therethrough;
    a pair of W-shaped forming rollers mounted vertically for transforming the V-shaped filler metal into a W-shaped filler metal while the filler metal passes therethrough;
    a flux injector for filling a flux between overlapped surfaces of the W-shaped filler metal;
    reducing rollers for reducing a horizontal width of the W-shaped filler metal filled with the flux, the reducing rollers being arranged by pairs, wherein an interval between each pair of the reducing rollers, which are arranged correspondingly to each other, is gradually reduced in a conveyance direction of the W-shaped filler metal;
    a compression roller and a first stereotype roller for further compressing and stereotyping either side of the W-shaped filler metal having the reduced horizontal width, the stereotype roller having a groove formed on the outer peripheral surface thereof;

a saw-tooth roller and a second stereotype roller for forming saw-tooth marks on a side surface of the W-shaped filler metal to prevent a leakage of the flux; and a winder for winding the W-shaped filler metal thereon.

2. The apparatus for manufacturing a sealed flux laminated alloy filler metal according to claim 1, wherein overlapped surfaces of the W-shaped filler metal are sealed by means of welding of welding bars.

* * * * *